Jan. 3, 1956 W. A. ANDERSON 2,729,793

INDUCTIVE COUPLING CIRCUITS FOR PULSES

Filed Oct. 20, 1951

INVENTOR
WARREN A. ANDERSON
BY Percy P. Lantzy
ATTORNEY

United States Patent Office 2,729,793

Patented Jan. 3, 1956

2,729,793

INDUCTIVE COUPLING CIRCUITS FOR PULSES

Warren A. Anderson, Nutley, N. J., assignor to International Telephone and Telegraph Corporation, a corporation of Maryland Application October 20, 1951, Serial No. 252,281

8 Claims. (Cl. 333—20)

This invention relates to coupling circuits and more particularly to inductive coupling circuits capable of rapid response to pulse transmission.

Inductive coupling circuits and transformers employed for pulse circuits are designed on the basis of the duty cycle to which the coupling is expected to operate, the duty cycle being defined as the product of the pulse repetition rate and the pulse duration. This definition of duty cycle, however, is based upon the premise of uniform distribution of pulses with respect to time. The distribution of pulses in many pulse systems is not always uniform and as a consequence the response of the coupling circuits and transformers is not always uniform to successive pulses. For example, an inductive coupling circuit may not recover fully from one pulse before it must respond to a second pulse. Thus, where pulses are spaced closer than a predetermined minimum spacing, the inductive coupling will introduce distortion. This minimum spacing is determined by the recovery characteristic of the inductive circuit.

One of the objects of this invention is to provide a device for coupling across inductive circuits to reduce the recovery time normally required by such inductive circuits. Another object of the invention is to provide inductive coupling circuits and transformers used in pulse systems with means for reducing the duration of the inductive reaction of such coupling circuits.

The invention, briefly, comprises the provision of a transmission line of the character adapted to reflect input signals for connection across the inductive circuit, the line having means, such as a diode, associated therewith to suppress reflections of one given polarity. More particularly, the transmission line is in the form of a delay network having a terminating impedance equal to the characteristic impedance of the line and a diode connected thereacross. The diode insures an inversion of the reflection of an input signal and also acts as an open circuit to back reflections produced by the initial reflection. The delay characteristics of the line is selected preferably to equal one-half the duration of the input pulse so that the inverted reflection counteracts substantially the inductive reaction of the coupling circuit. This reflection being equal to the duration of the input circuit thus limits the recovery time of the coupling circuit to the duration of the input pulse.

The above-mentioned and other features and objects of this invention will become more apparent by reference to the following description taken in conjunction with the accompanying drawings, wherein.

Figure 1:
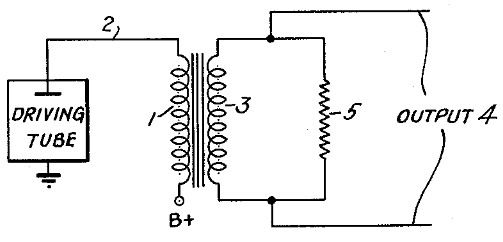
Fig. 1 is a schematic illustration of an inductive coupling circuit having a damping resistor in accordance with prior art practice.

Referring to Fig. 1 of the drawing, a conventional form of inductive coupling circuit is shown to comprise a primary coil 1 connected to a driving circuit 2 and a secondary 3 across which an output circuit 4 is coupled. Also coupled across the secondary is a resistor 5 employed to dampen the inductive reaction of the coupling circuit 1, 3. The coupling circuit may comprise a transformer having an iron core, or it may comprise a pair of coupled coils with an air core. In operation of this prior art circuit, let it be assumed that the driving circuit 2 applies across the primary a pulse, such as pulse 6 of Fig. 3. In the output circuit the pulse 6 will appear as indicated at 6*a* followed by a negative trailing pulse 7. This trailing pulse represents the inductive reaction of the inductive coupling circuit, the total area of which equals substantially the area of the input pulse 6. The recovery time of the inductive circuit is represented by the duration of the negative pulse 7 or $t_1$. It will be observed that if a second input pulse occurs during the interval $t_1$ that it will be distorted by pulse 7. The prior art circuit thus requires minimum spacing represented by $t_1$.

Figure 2:
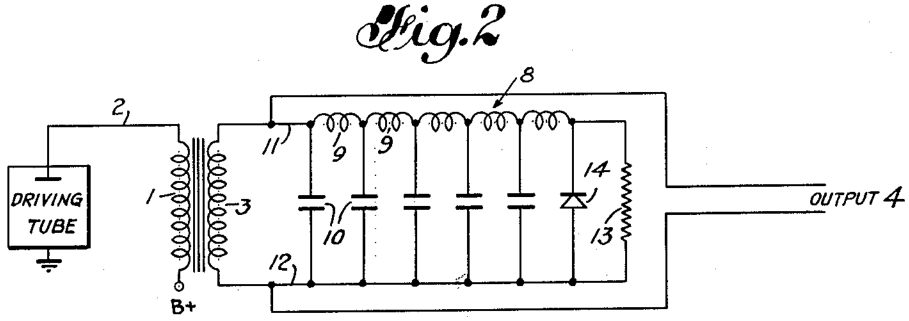
Fig. 2 is a schematic illustration of an inductive coupling circuit provided with a device according to the principles of this invention.

Referring to Fig. 2, the device according to the present invention comprises a reflecting transmission line 8 in the form of a delay network composed of inductances 9 and capacitances 10. The input terminals 11 and 12 of the network are connected across one of the coils of the inductive coupling circuit such as secondary 3. The opposite end of the network has connected thereacross a termination impedance 13 selected substantially equal to the characteristic impedance of the line. Also connected across the line at the termination impedance is a diode 14. The electrical length or delay characteristic of the transmission line 8 is preferably selected one-half the duration of the input pulse 6.

Figure 3:
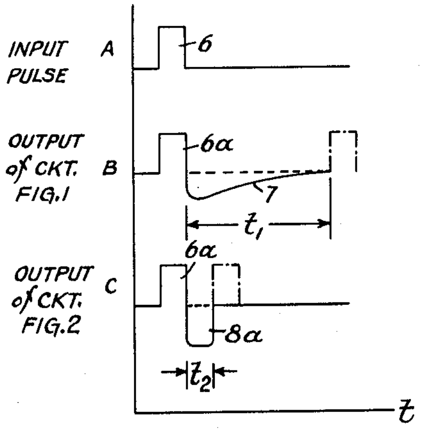
Fig. 3 is a set of curves useful in explaining the operation and advantages of the present invention.

In operation of the circuit illustrated in Fig. 2, let it be assumed that a positive pulse, such as pulse 6 of Fig. 3, is transmitted through the coupling inductance 1, 3 and is transmitted down the transmission line 8. The diode 14 is so connected across the network that it presents a short circuit to such transmission, thereby causing a reversal of the pulse polarity as it is reflected back along the line. Since the delay line has a delay characteristic equal substantially to one-half the pulse 6 a negative pulse 8*a* appears across the terminals 11, 12 immediately following the positive pulse 6*a*. The duration of the negative pulse 8*a* is equal to twice the electrical length of the delay network 8 and is represented by the interval $t_2$. Since the driving tube of circuit 2 is at cut-off and, therefore, presents an open circuit to the transformer primary, the transformer coupling will not absorb all the energy delivered to it by the delay line. A certain amount of the energy thus delivered will be reflected back down the delay line. This reflected energy, however, will be of the same polarity, negative, as pulse 8*a* and when it reaches the terminating impedance 13 it will be dissipated since the diode 14 presents an open circuit to the negative pulse.

From the foregoing it will be clear that the delay line 8 conducts, in response to a positive input pulse, a negative pulse back to the output terminals of the coil 3 thereby counteracting the inductive reactance of the transformer, thus shortening the response time of the coupling circuit to the duration of the reflected pulse. The circuit according to this invention can thus handle successive pulses having a spacing as small as the interval $t_2$ as compared to the greater interval $t_1$ required for the prior art circuit of Fig. 1. The device of the present invention when applied to an inductive circuit permits the speeding up of pulse transmission of the circuit with a minimum spacing equal to the duration of the pulses.

While the delay line 8 is preferably selected of an electrical length equal to one-half the duration of the input pulse it may obviously be of a different electrical length. Where the electrical length of the delay line is less than one-half the duration of the input pulse, the reflected pulse will not only shorten the response time of the coupling circuit but also result in cancelling the trailing edge portion of the input pulse, thereby narrowing the pulse transmitted. This narrowing of transmitted pulses is a pulse shaping operation of which the circuit of this invention is capable depending on the selected electrical length of the delay line.

While I have described above the principles of my invention in connection with specific apparatus, it is to be clearly understood that this description is made by way of example only and not as a limitation to the scope of my invention as set forth in the objects thereof and in the accompanying claims.

I claim:

1. A device for coupling across an inductive circuit to reduce the duration of the inductive reaction of said circuit upon transmission of an electric pulse therethrough, comprising a transmission line having common input and output terminals at one end thereof for coupling across said inductive circuit, means terminating the other end of said line in its characteristic impedance including a second means to present at said other end an effective short circuit to pulses of a given polarity to thereby invert and reflect them back to said common terminals, and to present an effective open circuit to pulses of polarity opposite to said given polarity whereby pulses of said opposite polarity are suppressed.

2. A device according to claim 1, wherein said transmission line includes a delay network.

3. A device according to claim 2, wherein said second means includes a rectifier coupled across said delay network.

4. A device according to claim 2, wherein the delay characteristic of said delay network is selected equal to a given fraction of the duration of the pulse transmitted through said inductive circuit.

5. A device according to claim 2, wherein the delay characteristic of the delay network is selected equal to substantially one-half the duration of the pulse transmitted through the inductive circuit.

6. In combination with an inductive coupling circuit having primary and secondary coils, a delay network having one end thereof coupled across one of said coils, means terminating the other end of said network in its characteristic impedance and means coupled across said network adjacent said other end to present an effective short circuit to electrical surges of a given polarity to thereby invert and reflect those surges of said given polarity and to present an effective open circuit to electrical surges of polarity opposite to said given polarity whereby surges of said opposite polarity are suppressed.

7. In a combination according to claim 6, wherein the means coupled across said network includes a rectifier.

8. In a combination according to claim 6, wherein the inductive coupling circuit comprises a transformer and said one end of the delay network is coupled across the secondary of said transformer.

References Cited in the file of this patent

UNITED STATES PATENTS

| | | |
|---|---|---|
| 2,181,568 | Kotowski et al. | Nov. 28, 1939 |
| 2,188,970 | Wilson | Feb. 6, 1940 |
| 2,227,906 | Kellogg | Jan. 7, 1941 |
| 2,443,790 | Forbes | June 22, 1948 |
| 2,525,454 | Lord | Oct. 10, 1950 |
| 2,543,907 | Gloess et al. | Mar. 6, 1951 |